United States Patent [19]

Inoue et al.

[11] Patent Number: 4,775,909
[45] Date of Patent: Oct. 4, 1988

[54] MAGNETIC HEAD USING A MAGNETIC THIN FILM AND FIRST, SECOND AND THIRD CORE MEMBERS

[75] Inventors: Shinichi Inoue; Shuzo Abiko, both of Chichibu; Hirokazu Goto, Tokyo; Masakazu Kuhara, Chichibu, all of Japan

[73] Assignee: Canon Denshi Kabushiki Kaisha, Chichibu, Japan

[21] Appl. No.: 697,076

[22] Filed: Jan. 31, 1985

[30] Foreign Application Priority Data

Feb. 3, 1984 [JP] Japan .................. 59-17199

[51] Int. Cl.$^4$ .................. G11B 5/133; G11B 5/147
[52] U.S. Cl. .................. 360/127; 360/122; 360/125; 360/126
[58] Field of Search .............. 360/110, 119, 118, 122, 360/125, 126, 127

[56] References Cited

U.S. PATENT DOCUMENTS 4,551,777 11/1985 Saito et al. .................. 360/121
4,622,616 11/1986 Isshiki .................. 360/122 X

FOREIGN PATENT DOCUMENTS

| 52-48305 | 4/1977 | Japan | 360/118 |
| 56-34126 | 4/1981 | Japan | 360/126 |
| 57-18016 | 1/1982 | Japan | 360/110 |
| 57-6429 | 1/1982 | Japan | 360/110 |
| 57-64323 | 4/1982 | Japan | 360/110 |
| 58-56218 | 4/1983 | Japan | 360/110 |
| 60-13311 | 1/1985 | Japan | 360/110 |
| 60-29916 | 2/1985 | Japan | 360/110 |

Primary Examiner—John H. Wolff
Assistant Examiner—Alfonso Garcia
Attorney, Agent, or Firm—Spencer & Frank

[57] ABSTRACT

Magnetic thin films are formed on two base plates in relation to tracks of a recording medium. After a non-magnetic thin film is disposed on the magnetic thin films, the two base plates are joined via the non-magnetic thin film to form a magnetic gap, so that a magnetic head is fabricated. The magnetic head can be mass-produced in a simple process with uniform quality, and offers a small area of the surface opposite to each other in adjacent recording and/or reproducing portions, so that crosstalk is reduced.

11 Claims, 8 Drawing Sheets

MAGNETIC HEAD USING A MAGNETIC THIN FILM AND FIRST, SECOND AND THIRD CORE MEMBERS

BACKGROUND OF THE INVENTION

1. Field of the Invention

The present invention relates to a magnetic head and to a fabrication process therefor, and more particularly to a magnetic head for high density recording and/or reproduction such as those used in video-tape recorders and still video cameras and to a fabrication process therefor.

2. Description of the Prior Art

An explanation shall be made of an example of a prior art magnetic head having a plurality of magnetic recording and/or reproducing members together with a fabrication process therefor, with reference to FIGS. 1-5.

Figure 1:
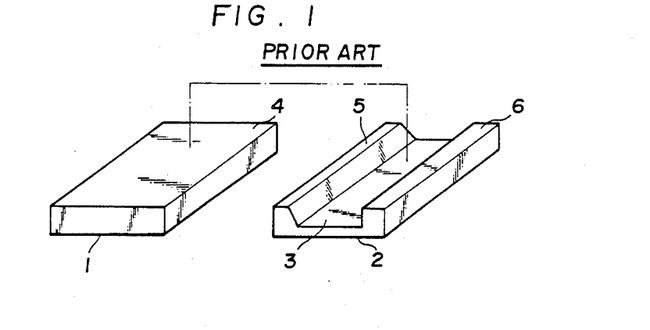
FIG. 1 is a perspective view showing a magnetic head core half block used in a conventional fabrication process for a magnetic head.

In FIG. 1, reference numerals 1 and 2 denote half blocks of a magnetic head core. The first half block 1 of the magnetic head core is a rectangular parallelepiped, and has an abutment surface 4 for abutting with the second half block 2 of the magnetic head core on the other side.

The second half block 2 of the magnetic head core has a coil groove 3 formed on the main plane of a parallelepiped, and has abutment surfaces 5 and 6 for abutting with the first half block 1 of the magnetic head core.

The materials in these half blocks 1 and 2 of the magnetic head core (hereinafter referred to as the core half blocks) can be ferrite or Sendust which has a high permeability.

The abutment surfaces 4, 5 and 6 of these core half blocks 1 and 2 are finished with a flat surface, and then a non-magnetic material, for example, $SiO_2$, is deposited on the surfaces 4, 5 and 6 to form a non-magnetic thin film for forming a magnetic gap 7.

Figure 2:
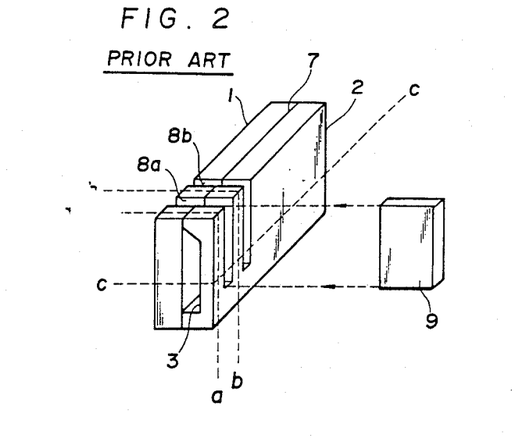
FIG. 2 is a perspective view explaining the procedure for forming a magnetic core block from the magnetic core half blocks shown in FIG. 1.

Next, the core half blocks 1 and 2 are adhered to each other via the non-magnetic thin film as shown in FIG. 2, so as to obtain a magnetic head core block having a magnetic gap 7. Then, in order to separate adjacent recording and/or reproducing tracks on a magnetic recording medium, grooves 8a and 8b are formed at specific intervals longitudinally along the block, and at a depth whirh does not cause the blocks to be separated. A shielding plate 9 for separating the tracks is fitted into and secured in these grooves 8a and 8b.

Subsequently, this block is cut longitudinally along a plane shown by a dotted line c—c which intersects with grooves 8a and 8b. Furthermore, the block is cut along planes indicated by dotted lines a—a and b—b so as to obtain a magnetic core member which has the same thickness on either side of the shielding plate 9.

Figure 3:
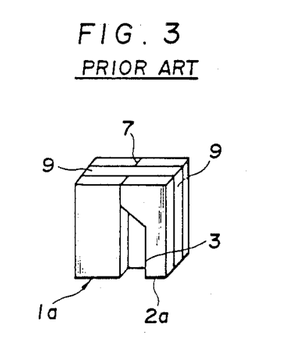
FIG. 3 is a perspective view showing the magnetic core member obtained from the magnetic core block shown in FIG. 2.

The magnetic core member 1a thus obtained is shown in FIG. 3. This magnetic core member 1a comprises the shielding plate 9, on both sides of which the magnetic gaps 7 and 7 are positioned to form a single straight line.

Figure 4:
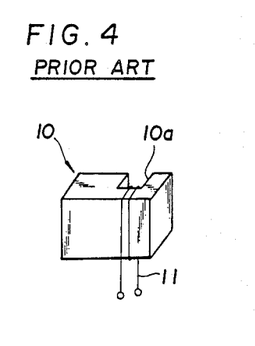
FIG. 4 is a perspective view showing an auxiliary core which is to be coupled to the magnetic core member shown in FIG. 3.

Because the interval between tracks, i.e., the thickness of the shielding plate 9, of this magnetic core member 1a is generally narrow on the order of several tens of microns, it is necessary to provide an auxiliary core 10 as shown in FIG. 4 so as to form a space to wind a winding. This auxiliary core 10 is in the form of a parallelepiped having a groove 10a formed on one side surface thereof in order to wind a winding 11. The material of this auxiliary core 10 can be ferrite or Sendust which has a high permeability.

Figure 5:
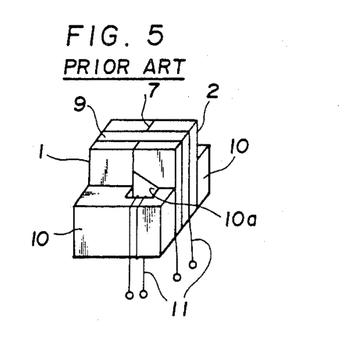
FIG. 5 is a perspective view showing a conventional magnetic head obtained by joining the magnetic core member shown in FIG. 3 and the auxiliary core shown in FIG. 4.

The winding 11 is wound around the coil groove 10a of this auxiliary core 10. Two auxiliary cores 10 each having the winding 11 are adhered to the respective side surfaces of the magnetic core member 1a in a manner such that the two auxiliary cores 10 are opposite each other as shown in FIG. 5 to form a magnetic ciruit which is magnetically conductive. In this way a magnetic head is obtained.

In a prior art magnetic head having such a structure, the area of the opposing surfaces of the core half blocks 1 and 2 is large, so that there is a disadvantage in that the amount of crosstalk between adjacent tracks is not reduced, even if the material and the shape of the shielding plate 9 are devised.

Furthermore, as shown in FIG. 2, the core half blocks 1 and 2 are cut a plurality of times in various direction so that there is the defect of complexity and high cost in the fabrication process.

SUMMARY OF THE INVENTION

It is, therefore, an object of the present invention to provide a magnetic head having little crosstalk between adjacent magnetic recording and/or reproducing members.

It is another object of the present invention to provide a fabrication process which facilitates massproduction of a magnetic head having little crosstalk between adjacent magnetic recording and/or reproducing members simply and at low cost.

In order to achieve these objects, in a first aspect of the present invention, a magnetic head comprises: a first base plate and a second base plate disposed to be opposite to each other; first and second magnetic thin films disposed on the first and second base plates in relation to tracks on a recording medium; a non-magnetic thin film disposed between the first and second magnetic thin films to form a magnetic gap; and a magnetic member for forming a magnetic circuit with the first and second thin films.

Here, the non-magnetic thin film may be disposed on the first magnetic thin film in the vicinity of the end side of the first base plate. The first base plate may have a portion which is so formed that a winding for producing a magnetic flux in the magnetic circuit is wound around the portion. The first and second base plates can have the same shape. The magnetic member may have a portion which is so formed that a winding for producing a magnetic flux in the magnetic circuit is wound arornd the portion. The first and second base plates may be formed by a non-magnetic material.

The magnetic member may include a third magnetic thin film which is arranged on the end surfaces of the first and second base plates on the side opposite to the end surfaces thereof which are opposite to the recording medium, so that the third thin film and the first and second magnetic thin films form the magnetic circuit. Here, the magnetic member may further include a non-magnetic base plate on which the third magnetic thin film is disposed corresponding to tracks of the recording medium.

Either one of the first and second base plates is of magnetic material and the other is of non-magnetic material. Here, the magnetic member may include a third magnetic thin film which is arranged on the end surfaces of the first and second base plates on the side opposite to the end surfaces thereof which are opposite to the recording medium, so that the third thin film and the first and second magnetic thin films form the magnetic circuit. The magnetic member may further include a non-magnetic base plate on which the third magnetic thin film is disposed corresponding to tracks of the recording medium.

A plurality of the first thin films and a plurality of the second thin films may be provided corresponding to a plurality of tracks of the recording medium.

Furthermore, in a second aspect of the present invention, a process for fabricating a magnetic head comprises the steps of:

forming first and second magnetic thin films on one of the main surfaces of first and second base plates in relation to tracks on a recording medium;

forming a non-magnetic thin film on the second magnetic thin film in the vicinity of the end surface of at least one of the first and second base plates on the side opposite to the recording medium;

joining the first and second base plates in a manner that the first and second magnetic thin films are opposite to each other;

cutting the first and second base plates thus joined along a plane parallel to the end surface;

forming third and fourth magnetic thin films on the cut surfaces of the first and second base plates thus cut; and joining a third base plate on which a fifth magnetic thin film is formed corresponding to the cut surface to the first and second base plates in a manner such that the fifth magnetic thin film is magnetically coupled to the third and fourth magnetic thin films on the cut surface.

Here, the first, second, third, fourth and fifth magnetic thin films and the non-magnetic thin film may be formed by sputtering or vapor deposition.

The fabrication process for a magnetic head may further comprise the steps of:

depositing a magnetic material uniformly on one of the main surfaces of the first and second base plates to form the first and second magnetic thin films; and removing partly the first and second magnetic thin film in relation to tracks of the recording medium to form first and second magnetic thin film strips extending away from the end surface corresponding to the tracks.

Here, the first and second magnetic thin film strips may be formed by photolithography or etching. After cutting the first and second base plates, a notch may be formed along a portion of the first base plate on which the first magnetic thin film strip is not disposed from the end surface opposite to the end surface to form a space for winding a winding corresponding to the tracks. Here, a recess is formed in the first base plate along the direction of the cut surface in advance, and the first magnetic thin film is formed on the one main surface of the first base plate including the cavity.

The fabrication process for a magnetic head may further comprise the step of forming the fifth magnetic thin film on the third base plate corresponding to the cut surface of the first and second base plates. This fabrication process may further comprise the step of forming a notch in the third base plate in advance to form a space for winding a winding. Alternatively, the fabrication process may further comprise the step of forming a hole in the direction of the formation of the fifth thin film in the third base plate to form a space for winding a winding.

The above and other objects, effects, features and advantages of the present invention will become more apparent from the following description of preferred embodiments thereof taken in conjunction with the accompanying drawings.

DETAILED DESCRIPTION OF THE PREFERRED EMBODIMENTS

FIGS. 6–15 show an embodiment of a magnetic head and a fabrication process thereof according to the present invention. In the drawings, reference numerals 12 and 13 denote non-magnetic base plates which have winding grooves 14 formed in the respective central portions of the base plates, and abutment surfaces 16 and 17 formed along both edges of the base plates so that the base plates can be abutted to each other.

Figure 7:
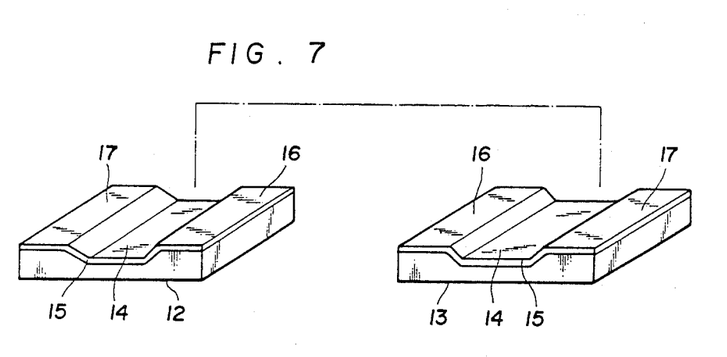
FIG. 7 is a perspective view showing two members having magnetic thin films deposited respectively on the two base plates shown in FIG. 6; p

As shown in FIG. 7, on the whole area of each of the abutment surfaces 16 and 17 including the winding grooves 14 of the non-magnetic base plates 12 and 13, a thin film 15 of a magnetic material such as Sendust is formed by a conventional thin film deposition method such as sputtering or by the vapor deposition process.

It is preferable that this thin film of magnetic material has a thickness from several microns to several tens of microns.

Figure 8:
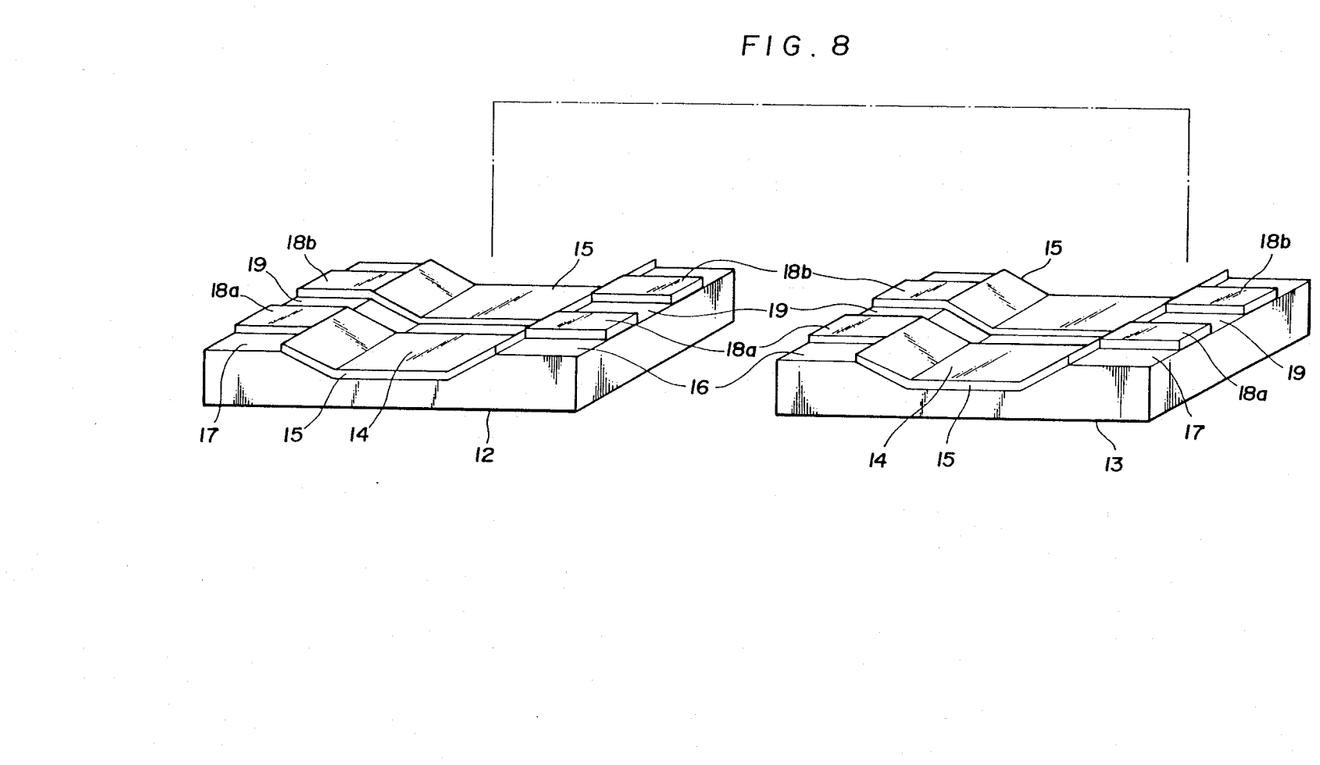
FIG. 8 is a perspective view showing two members on which the magnetic thin films are partly removed from the two members shown in FIG. 7 so as to form a recording and/or reproducing member on a magnetic head corresponding to a track to be formed on a recording medium.

Next, as shown in FIG. 8, a part of the magnetic thin film 15 is removed by, for example, etching to form a plurality of strips 18a and 18b having opposite patterns respectively on the abutment surfaces 16 and 17 and continuous portions on the respective winding grooves 14. Furthermore, the thin film 15 is removed from the space between these strips 18a and 18b to form a separating section 19 that separates the strips 18a and 18b from each other. The widths of strips 18a and 18b and the width of the separating section 19 can be determined with a satisfactorily high degree of accuracy corresponding to a track width and to a width of the space between tracks by using a conventional technique for forming a fine pattern such as photolithography or dry-etching.

Figure 9:
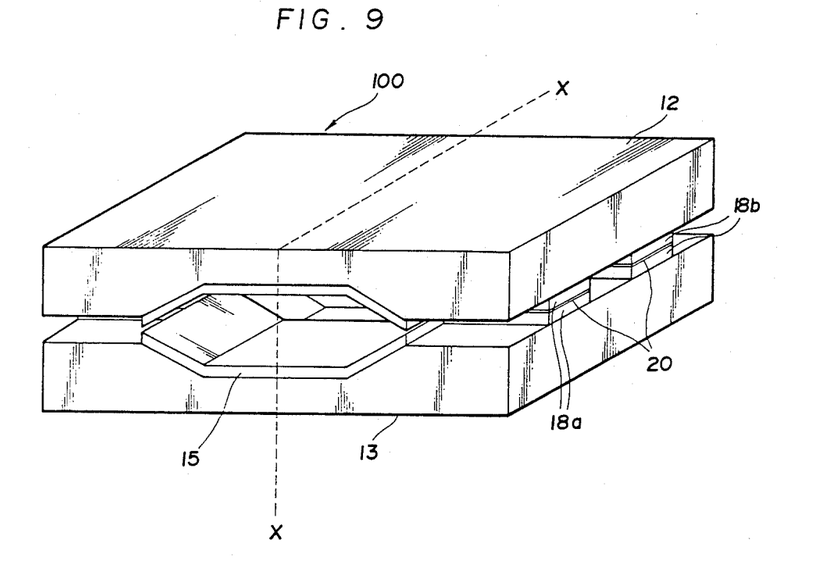
FIG. 9 is a perspective view showing an intermediate assembly in which the two members are joined after a magnetic thin film is partly layered on the two members shown in FIG. 8 so as to form a recording and/or reproducing member.

Non-magnetic base plates 12 and 13 having the strips 18a and 18b and the separating section 19 as just described provide core half blocks. Further, a thin film of a non-magnetic material such as $SiO_2$ is formed by a conventional thin film deposition method on the abutment surface in the edge portion of at least one of the strips 18a and 18b so as to form a magnetic gap 20 (FIG. 9). As shown in FIG. 9, these two core half blocks are abutted and joined to each other via the magnetic gap 20 to form a core block 100.

Figure 10:
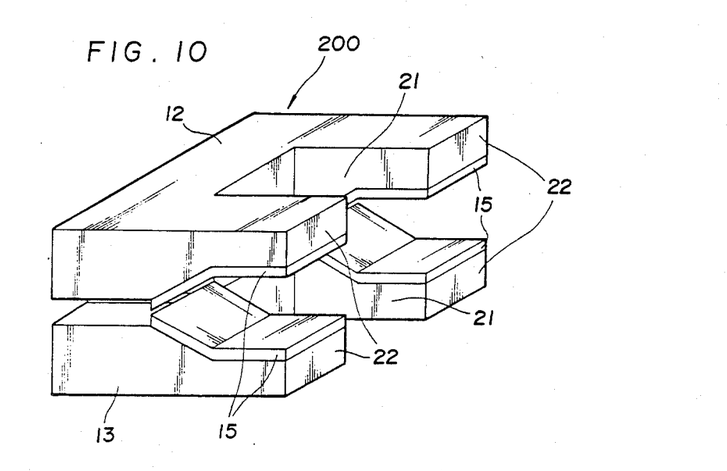
FIG. 10 is a perspective view showing a core block formed by cutting the intermediate assembly shown in FIG. 9 along the dotted line X—X in FIG. 9, and then by cutting out portions of the cut assembly to form a notch for mounting a winding.

Subsequently, the core block 100 is cut into two parts along the dotted line X—X shown in FIG. 9. Then, as shown in FIG. 10, second winding grooves 21 are formed in the upper and lower non-magnetic base plates 12 and 13 along the strips 18a and 18b in the space between the strips 18a and 18b from the cut surfaces 22 of the base plates 12 and 13, i.e., from the rear edge on the side opposite the magnetic gap 20 to obtain a core block 200. This winding groove 21 has a specific depth which is sufficient to accommodate a winding 24 (FIG. 12).

Figure 11:
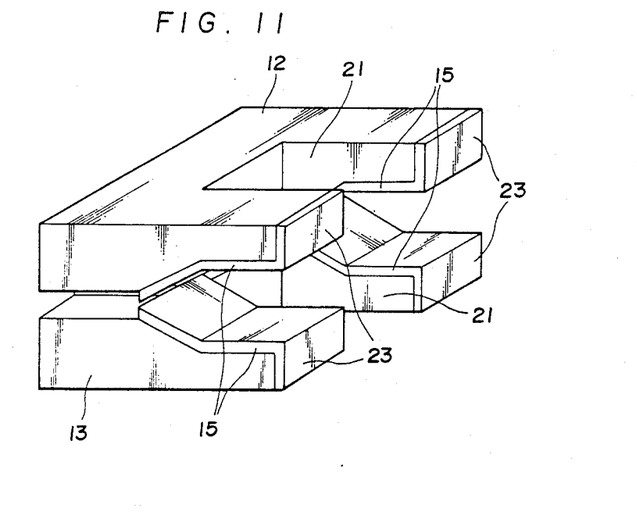
FIG. 11 is a perspective view showing the core block having a magnetic thin film layered on the core block shown in FIG. 10 in order to couple the core block to a back core so as to form a magnetic circuit.

Then, as shown in FIG. 11, thin films 23 of magnetic material are formed on the cut surfaces 22 on both sides of the grooves 21 of the core block 200 shown in FIG. 10 by a conventional thin film deposition method. These magnetic thin films 23 are to form a magnetic circuit between the strips 18a and 18b and a magnetic thin film 26 on a back core 400 (FIG. 13) described below.

Figure 12:
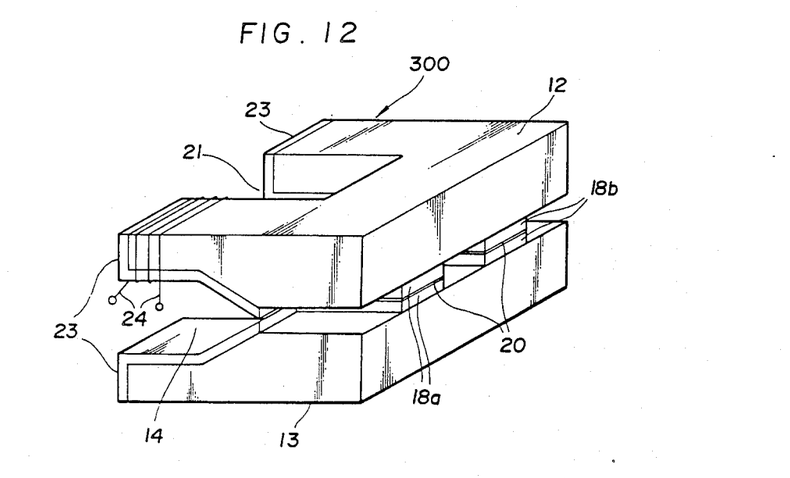
FIG. 12 is a perspective view showing a magnetic head core obtained by winding a winding around the core block shown in FIG. 11.
Figure 14:
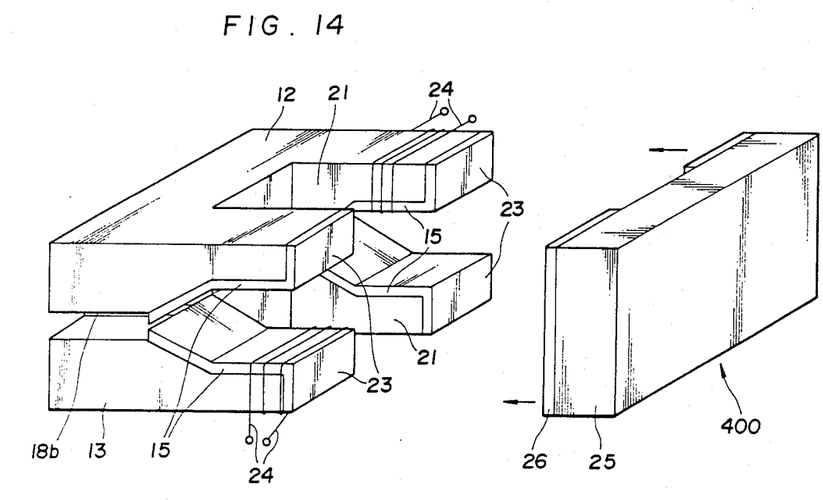
FIG. 14 is a perspective view explaining the process for coupling the back core shown in FIG. 13 to the magnetic head core shown in FIG. 12.
Figure 15:
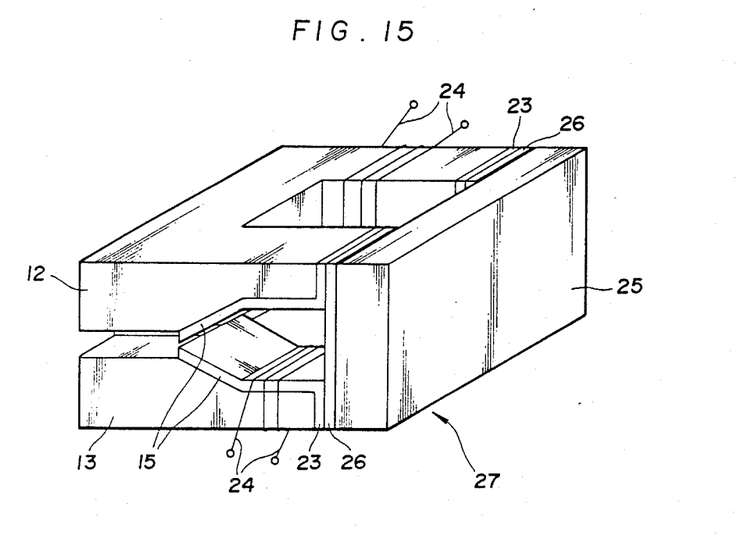
FIG. 15 is a perspective view showing an embodiment of a magnetic head in accordance with the present invention, obtained by the process shown in FIG. 14.

Next, as shown in FIGS. 12 and 14, windings 24 corresponding to the strips 18a and 18b are wound through the winding grooves 14 and 21 between the non-magnetic base plates 12 and 13 to obtain a magnetic head core 300.

Figure 13:
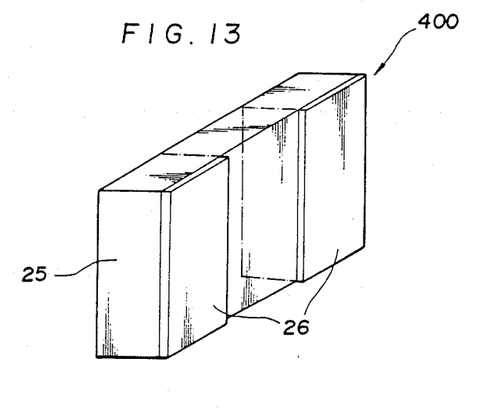
FIG. 13 is a perspective view showing an embodiment of the back core.

On the other hand, as shown in FIG. 13, a non-magnetic base plate 25 having a rectangular surface corresponding to the overall outer shape of the cut surface 23 of the magnetic head core 300 is prepared. To both the edges of this rectangular surface are applied two magnetic thin films 26 corresponding to the two cut surfaces of the magnetic thin films 23 to form a back core 400.

Subsequently, as shown in FIG. 14, the surfaces of the magnetic thin films 23 of the magnetic head core 300 and the surfaces of the magnetic thin films 26 of the back core 400 are aligned with each other. The magnetic head core 300 and the back core 400 thus aligned are coupled to form a magnetic head 27 shown in FIG. 15. In this manner, the magnetic thin films 23 and 26 are abutted, so that each pair of the strips 18a and the strips 18b separated on the upper and lower sections of the magnetic head core 300 forms a magnetic circuit which is magnetically conductive for each track through the magnetic thin films 23 and 26 to form a magnetic recording and/or reproducing member for each track.

The area of the opposing surfaces between the adjacent strips 18a and 18b of the magnetic head obtained in this manner corresponds to the sum of the areas of the opposing surfaces of the magnetic thin films 15 on the upper and lower sides of the magnetic gap 20. In comparison with the conventional structure described above, the opposing surface area of adjacent tracks is reduced to one part in several tens and thus the crosstalk between tracks is substantially reduced.

Furthermore, since a conventional thin film technique such as a thin film deposition method or photolithography can be used for the fabrication of the magnetic head, the magnetic head can be easily fabricated by mass-production methods with uniform quality and a lower cost than convention magnetic heads.

However, in the magnetic head according to the present invention as just described, the magnetic circuit is formed by the magnetic thin films 15, 23 and 26, so that this may cause problems of reduced recording and/or reproducing efficiency due to increases in magnetic resistance, and of the influence of the form effect of the magnetic circuit at low frequencies.

In such cases, the problem can be resolved by replacing either one of the non-magnetic base plates 12 and 13 with a base plate of a magnetic material such as ferrite or Sendust. Use of this construction suppresses the increase in magnetic resistance and the influence of the form effect by the replaced magnetic base plate. For metal tapes and other high magnetic flux density recording mediums, magnetic thin films 15, 23 and 26 of a material such as Sendust can manage the removal of adverse influences.

Further, while the back core 400 is formed by the magnetic thin films 26 applied to the non-magnetic base 25, the back core can be formed by individual magnetic base plates formed separately for each individual track, as shown by a broken line in FIG. 13. This structure produces the same effects as described above, and has an advantage that the step of forming a magnetic thin film is omitted from the fabrication process and thus the overall process can be simplified. Further, this structure can be employed in either case where both base plates 12 and 13 are non-magnetic base plates, or where one of the base plates 12 and 13 is a magnetic base plate, as a matter of course.

While in the above explanation, the number of recording and/or reproducing tracks was two, it is clear that more than two recording and/or reproducing members can be integrally formed corresponding to more than two tracks for a multi-track arrangement.

Figure 6:
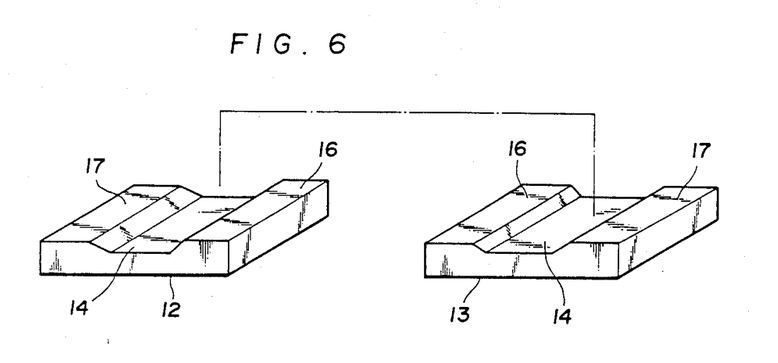
FIG. 6 is a perspective view showing an example of two base plates used in an embodiment of a magnetic head fabrication process according to the present invention.
Figure 16:
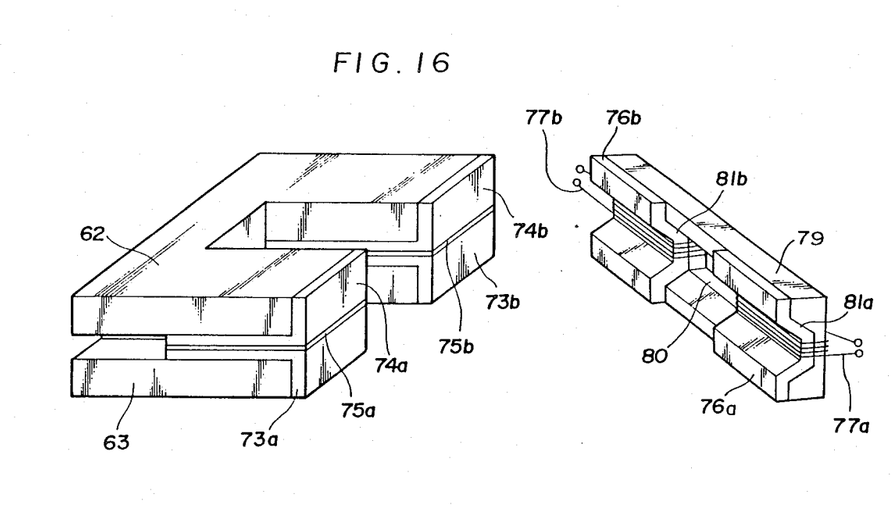
FIG. 16 is a perspective view showing another embodiment of a magnetic head in accordance with the present invention.

FIG. 16 is a perspective view showing various parts immediately before the complete assembly of a further embodiment of a magnetic head according to the present invention. In FIG. 16, reference numerals 62 and 63 denote non-magnetic base plates in substantially U-shaped form having no winding groove, unlike the previous embodiments having the winding grooves 14 as shown in FIG. 6. Reference numerals 74a and 74b denote magnetic thin films formed on the surfaces of the U-shaped legs of the base plate 62 according to the same steps as explained with reference to FIGS. 7, 8 and 11. Reference numerals 73a and 73b denote magnetic thin films formed on the surfaces of the U-shaped legs of the base plate 63 in the same manner as the formation of the magnetic thin films 74a and 74b. Reference numerals 75a and 75b are non-magnetic thin films which are sandwiched respectively between the respective opposing surfaces of the magnetic thin films 73a and 74a, and 73b and 74b, so that these non-magnetic thin films 75a and 75b form a magnetic gap (not shown) like that denoted by reference numeral 20 in FIG. 9 on the remote end surfaces of the base plates 62 and 63.

Reference numeral 79 denotes a non-magnetic base plate prepared by a step separated from the preparation of the above-mentioned base plates 62 and 63. On the base plate 79 are formed a hole 80 for windings 77a and 77b and winding grooves 81a and 81b together for winding the windings 77a and 77b. The winding grooves 81a and 81b are formed longitudinally in parallel with the layer direction of the non-magnetic thin films 75a and 75b. Reference numerals 76a and 76b denote magnetic thin films formed by thin film deposition on the grooved surfaces formed by the above-mentioned winding grooves 81a and 81b, respectively, on the base plate 79. The winding 77a is wound around the magnetic thin film 76a over the groove 81a and through the hole 80, and the winding 77b is wound around the magnetic thin film 76b over the groove 81b and through the hole 80.

One pair of the chips shown in FIG. 16 is joined so that the magnetic thin films 73a and 74a are connected magnetically to the magnetic thin film 76a, and that the magnetic thin films 73b and 74b are connected magnetically to the magnetic thin film 76b. As a result, a pair of magnetic circuits is formed. In this manner, a magnetic head having two aligned magnetic gaps is formed in a similar manner to the embodiment shown in FIG. 15.

Further, it is clear that the embodiment explained with reference to FIG. 16 also exhibits the same advantageous effects as the magnetic heads in the preceding embodiments.

In this manner, according to the present invention, there is provided a magnetic circuit including partly a plurality of recording and/or reproducing members formed by magnetic thin films deposited on the opposing surfaces of the two base plates to be joined in abutment, so that the area of the opposing surfaces of the adjacent recording and/or reproducing member is reduced to decrease crosstalk and that a magnetic head can be mass-produced with uniform quality at a lower cost than conventional magnetic heads.

What is claimed is:
1. A magnetic head comprising:
 (a) a first core member including
  a first base plate having a first surface and a second surface, and
  a first magnetic thin film deposited on said first surface;
 (b) a second core member including
  a second base plate having a third surface and a fourth surface, said first surface and said third surface being opposite to each other, and
  a second magnetic thin film deposited on said third surface;
 (c) a non-magnetic thin film arranged between said first and second magnetic thin films to form a magnetic gap for recording and/or reproducing; and
 (d) a third core member having a fifth surface, said third core member joining with said first core member and said second core member in a manner that said fifth surface is opposite to said second and fourth surfaces, and including a magnetic member which is magnetically connected with said first and second magnetic thin films.

2. A magnetic head as claimed in claim 1, wherein said second surface and said fourth surface are arranged in a common plane.

3. A magnetic head as claimed in claim 1, wherein said magnetic member includes a third magnetic thin film arranged along the fifth surface of said third core member.

4. A magnetic head as claimed in claim 3, wherein said third core member further includes a third base plate on which said third magnetic thin film is deposited.

5. A magnetic had as claimed in claim 4, wherein said third base plate consists of a non-magnetic material.

6. A magnetic head as claimed in claim 1, wherein said first base plate and said second base plate consist of a non-magnetic material.

7. A magnetic head as claimed in claim 1, wherein said first magnetic thin film is further deposited on said second surface and said second magnetic thin film is further deposited on said fourth surface.

8. A magnetic head as claimed in claim 1, wherein said first core member has a groove for winding a coil.

9. A magnetic head as claimed in claim 8, wherein said third core member has a groove for winding a coil.

10. A magnetic head comprising:
 (a) a first core member including
  a first base plate having a first surface and a second surface, and
  a plurality of first magnetic thin films deposited on said first surface, said plurality of first magnetic thin films being aligned to one another;
 (b) a second core member including
  a second base plate having a third surface and a fourth surface, and first surface and said third surface being opposite to each other, and
  a plurality of second magnetic thin films deposited on said third surface, said plurality of second magnetic thin films being aligned to one another;
 (c) a plurality of non-magnetic thin films arranged between said plurality of first and second magnetic thin films to form a plurality of magnetic gaps for recording and/or reproducing, respectively; and
 (d) a third core member having a fifth surface, said third core member joining with said first core member and said second core member in a manner that said fifth surface is opposite to said second and fourth surfaces, and including a plurality of magnetic members which are magnetically connected with said plurality of first and second magnetic thin films.

11. A magnetic head as claimed in claim 10, wherein each of said plurality of magnetic members includes a third magnetic thin film arranged along the fifth surface of said third core member.

* * * * *